(12) United States Patent
Liu et al.

(10) Patent No.: US 11,375,531 B2
(45) Date of Patent: Jun. 28, 2022

(54) SIGNAL MONITORING METHOD AND APPARATUS

(71) Applicant: HUAWEI TECHNOLOGIES CO., LTD., Shenzhen (CN)

(72) Inventors: Jianqin Liu, Beijing (CN); Xiang Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 16/925,481

(22) Filed: Jul. 10, 2020

(65) Prior Publication Data

US 2020/0344792 A1 Oct. 29, 2020

Related U.S. Application Data

(63) Continuation of application No. PCT/CN2019/071061, filed on Jan. 10, 2019.

(30) Foreign Application Priority Data

Jan. 12, 2018 (CN) .......................... 201810032706.4

(51) Int. Cl.
*H04W 4/00* (2018.01)
*H04W 72/12* (2009.01)

(52) U.S. Cl.
CPC .............................. *H04W 72/1289* (2013.01)

(58) Field of Classification Search
USPC .................... 370/328, 329, 330, 331, 336
See application file for complete search history.

(56) References Cited

U.S. PATENT DOCUMENTS

| 8,233,403 B2* | 7/2012 | Yin | H04W 88/06 370/252 |
| 2010/0290439 A1* | 11/2010 | Dai | H04L 1/1854 370/336 |

(Continued)

FOREIGN PATENT DOCUMENTS

| CN | 102547738 A | 7/2012 |
| CN | 102905370 A | 1/2013 |

(Continued)

OTHER PUBLICATIONS

NTT Docomo, Inc., "Discussion on remaining details on NR-PBCH and PBCH-DMRS", 3GPP TSG RAN WG1 Meeting NR#3, Nagoya, Japan, Sep. 18-21, 2017, R1-1716070, 14 pages.

(Continued)

*Primary Examiner* — David Q Nguyen
(74) *Attorney, Agent, or Firm* — Maier & Maier, PLLC

(57) ABSTRACT

A signal monitoring method and apparatus are provided. The method includes: determining, by a terminal device based on received configuration information, an index of a first time unit in which a start position of a control channel resource of a control channel is located, where a system frame number in which the first time unit is located is determined based on a first parameter; and monitoring, by the terminal device, the control channel starting from a time domain position corresponding to the index of the first time unit. In this way, the terminal device can monitor the control channel starting from a time unit corresponding to the index of the first time unit, to avoid monitoring the control channel extremely early and reduce overheads.

16 Claims, 4 Drawing Sheets

(56) References Cited

U.S. PATENT DOCUMENTS

| | | | |
|---|---|---|---|
| 2016/0182209 A1 | 6/2016 | Li et al. | |
| 2016/0301555 A1 | 10/2016 | Nory et al. | |
| 2020/0169956 A1* | 5/2020 | Sun | H04L 12/2803 |
| 2020/0178304 A1* | 6/2020 | Chen | H04W 76/27 |
| 2020/0205124 A1* | 6/2020 | Liu | H04W 52/02 |
| 2021/0219249 A1* | 7/2021 | Tang | H04L 27/2655 |
| 2021/0314910 A1* | 10/2021 | Rune | H04W 56/001 |

FOREIGN PATENT DOCUMENTS

| | | |
|---|---|---|
| CN | 104348579 A | 2/2015 |
| CN | 105490779 A | 4/2016 |

OTHER PUBLICATIONS

Fujitsu, "Consideration on timing indication based on SS block", 3GPP TSG RAN WG1 NR Ad-hoc#2, Qingdao, P. R. China, Jun. 27-30, 2017, R1-1710231, 4 pages.

Ericsson, "Remaining details on NR-RACH formats and configurations", 3GPP TSG RAN WG1 Meeting #91, Reno, Nevada, US, Nov. 27-Dec. 1, 2017, R1-1720940, 29 pages.

NTT Docomo, Inc., "Discussion on remaining details on RMSI delivery", 3GPP TSG RAN WG1 Meeting 90bis, Prague, CZ, Oct. 9-13, 2017, R1-1718181, 7 pages.

Huawei, Hisilicon, "Finalization of NR Paging", 3GPP TSG RAN WG1 Meeting #91, Reno, USA, Nov. 27-Dec. 1, 2017, R1-1719373, 7 pages.

3GPP, "33rd Generation Partnership Project; Technical Specification Group Radio Access Network; NR; Physical layer procedures for control (Release 15)", 3GPP TS 38.213 V15.0.0 (Dec. 2017), 2017, total 56 pages.

\* cited by examiner

SIGNAL MONITORING METHOD AND APPARATUS

CROSS-REFERENCE TO RELATED APPLICATIONS

This application is a continuation of International Application No. PCT/CN2019/071061, filed on Jan. 10, 2019, which claims priority to Chinese Patent Application No. 201810032706.4, filed on Jan. 12, 2018. The disclosures of the aforementioned applications are hereby incorporated by reference in their entireties.

TECHNICAL FIELD

This application relates to the communications field, and more specifically, to a signal monitoring method and apparatus.

BACKGROUND

If user equipment (UE) accesses a network, the UE needs to search for a cell and obtain system information of the cell. In new radio (NR), a synchronization signal is newly designed, and a synchronization signal/physical broadcast channel block (SS/PBCH block) and a synchronization signal/broadcast channel block (SSB) burst set are introduced. The SS/PBCH block, referred to as an SSB for short, includes an NR-primary synchronization signal (PSS), an NR-secondary synchronization signal (SSS), and an NR-physical broadcast channel (PBCH). One SSB occupies four consecutive orthogonal frequency division multiplexing (OFDM) symbols, and one SSB burst set is a time window whose duration is 5 ms. A maximum of L SSBs can be transmitted in a 5 ms SSB burst set. For different frequency bands, values of L are different. For example, for a frequency band below 3 GHz, L=4; for a frequency band from 3 GHz to 6 GHz, L=8; and for a frequency band from 6 GHz to 52.6 GHz, L=64.

After searching for the cell, the UE obtains downlink synchronization with the cell, and further needs to obtain the system information of the cell, to facilitate access to the cell and properly operate in the cell. Remaining minimum system information (RMSI) is scheduled by using a physical downlink control channel (PDCCH), and is transmitted on a physical downlink shared channel (PDSCH). There is a mapping relationship between the SSB and an RMSI CORESET, and configuration information including the mapping relationship is included in a master information block (MIB) in the SSB. Because NR supports a plurality of types of subcarrier spacings and flexible and complex time-domain configuration of an SSB, the mapping relationship between the SSB and the RMSI control resource set (CORESET) needs to be newly designed.

SUMMARY

Embodiments disclosed herein provide a signal monitoring method and apparatus, to precisely determine a time unit corresponding to an index of a first time unit, to avoid monitoring a control channel extremely early and reduce overheads.

According to a first aspect, a signal monitoring method is provided. The method includes: determining, by a terminal device based on received configuration information, an index of a first time unit in which a start position of a control channel resource is located, where a system frame number in which the first time unit is located is determined based on a first parameter; and monitoring, by the terminal device, the control channel starting from a time domain position corresponding to the index of the first time unit.

The terminal device determines, based on the configuration information and the first parameter, the index of the first time unit in which the start position of the control channel resource is located. In this way, the terminal device can monitor the control channel starting from a time unit corresponding to the index of the first time unit, to avoid monitoring the control channel extremely early and reduce overheads.

In some possible implementations, the first parameter is determined based on a relationship between a quantity of system frames in which control channel search spaces corresponding to all common signal blocks in an SSB burst set are located and a first preset system frame quantity.

The terminal device may determine the first parameter based on the relationship between the quantity of the system frames in which the control channel search spaces corresponding to all the common signal blocks in the SSB burst set are located and the first preset system frame quantity. Compared with a conventional solution in which a first parameter is a fixed value, in the embodiments as provided herein, flexibility of configuring the first parameter is improved.

In some possible implementations, the first parameter is a first value or a second value, and the second value is less than the first value; and that the first parameter is determined based on a relationship between a quantity of system frames in which control channel search spaces corresponding to all common signal blocks in an SSB burst set are located and a first preset system frame quantity includes: the first parameter is the first value when the quantity of system frames is greater than the first preset system frame quantity; or the first parameter is the second value when the quantity of system frames is less than or equal to the first preset system frame quantity.

A corresponding second value may be added when the quantity of system frames is greater than the first preset system frame quantity. The original first value may be retained when the quantity of system frames is less than or equal to the first preset system frame quantity, to increase an optional range of the first parameter.

In some possible implementations, the first value is 4, and the second value is 2.

In some possible implementations, the first preset system frame quantity is 1.

In some possible implementations, the quantity of the system frames in which the control channel search spaces corresponding to all the common signal blocks in the SSB burst set are located is determined based on at least one of a quantity of first time units included in one system frame, a start position parameter, a multiplexing factor, and a subcarrier spacing parameter, where the first time unit is a time unit determined based on a subcarrier spacing of the control channel.

In some possible implementations, $$k = \left\lfloor \frac{(O \cdot 2^{\mu} + \lfloor i_{max} \cdot M \rfloor)}{N_{slot}^{frame,\mu}} \right\rfloor,$$

where k is the quantity of the system frames in which the control channel search spaces corresponding to all the common signal blocks in the SSB burst set are located, $i_{max}$ is a maximum index of common signal blocks in the SSB burst set, $N_{slot}^{frame,\mu}$ is the quantity of first time units included in one system frame, the first time unit being the time unit determined based on the subcarrier spacing of the control channel, O represents the start position parameter, M is the multiplexing factor, and µ is the subcarrier spacing parameter.

In some possible implementations, the system frame number satisfies $$\text{mod}(SFN, T_m) = \left\lfloor \frac{(O \cdot 2^\mu + \lfloor i \cdot M \rfloor)}{N_{slot}^{frame,\mu}} \right\rfloor,$$

where SFN represents a system frame number in which a control channel search space corresponding to a common signal block is located, i is an index number of the common signal block, $T_m$ is the first parameter, $N_{slot}^{frame,\mu}$ is the quantity of first time units included in one system frame, the first time unit being the time unit determined based on the subcarrier spacing of the control channel, O represents the start position parameter, M is the multiplexing factor, and µ is the subcarrier spacing parameter.

In some possible implementations, the method further includes: determining, by the terminal device, the multiplexing factor M based on a relationship between duration of the control channel resource and a preset duration threshold; or determining, by the terminal device, the multiplexing factor M based on a relationship between the quantity of the system frames in which the control channel search spaces corresponding to all the common signal blocks in the SSB burst set are located and a second preset system frame quantity.

The terminal device may determine different M values based on the relationship between the duration of the control channel resource and the preset duration threshold, thereby improving the flexibility of configuring M.

In some possible implementations, a value of M is a first quantity and a second quantity, whereby the first quantity is greater than the second quantity; and the determining, by the terminal device, of M based on a relationship between duration of the control channel resource and a preset duration threshold includes: determining, by the terminal device, that the value of M is the first quantity when the duration of the control channel resource is greater than the preset duration threshold; or determining, by the terminal device, that the value of M is the second quantity when the duration of the control channel resource is less than or equal to the preset duration threshold.

In some possible implementations, a value of M is a first quantity or a second quantity, whereby the first quantity is greater than the second quantity; and the determining, by the terminal device, of M based on a relationship between the quantity of system frames occupied by control channel search spaces corresponding to all common signal blocks in an SSB burst set and a second preset system frame quantity includes: determining, by the terminal device, that the value of M is the second quantity when the quantity of the system frames in which the control channel search spaces corresponding to all the common signal blocks in the SSB burst set are located is greater than the second preset system frame quantity; or determining, by the terminal device, that the value of M is the second quantity when the quantity of the system frames in which the control channel search spaces corresponding to all the common signal blocks in the SSB burst set are located is less than or equal to the second preset system frame quantity.

In some possible implementations, the first quantity is 1, and the second quantity is ½.

According to a second aspect, a signal monitoring method is provided. The method includes: determining, by a network device, configuration information, where the configuration information is used to determine an index of a first time unit in which a start position of a control channel resource is located, and a system frame number in which the first time unit is located is determined based on a first parameter; and sending, by the network device, the configuration information.

The network device determines the configuration information, and sends the configuration information, so that a terminal device determines, based on the configuration information and the first parameter, the index of the first time unit in which the start position of the control channel resource is located. In this way, the terminal device can monitor the control channel starting from a time unit corresponding to the index of the first time unit, to avoid monitoring the control channel extremely early and reduce overheads.

In some possible implementations, the first parameter is determined based on a relationship between a quantity of system frames in which control channel search spaces corresponding to all common signal blocks in an SSB burst set are located and a first preset system frame quantity.

In some possible implementations, the first parameter is a first quantity or a second quantity, whereby the second quantity is less than the first quantity; and the first parameter is determined based on a relationship between a quantity of system frames in which control channel search spaces corresponding to all common signal blocks in an SSB burst set are located and a first preset system frame quantity includes: the first parameter is the first value when the quantity of system frames is greater than the first preset system frame quantity; or the first parameter is the second value when the quantity of system frames is less than or equal to the first preset system frame quantity.

In some possible implementations, the first value is 4, and the second value is 2.

In some possible implementations, the first preset system frame quantity is 1.

In some possible implementations, the quantity of the system frames in which the control channel search spaces corresponding to all the common signal blocks in the SSB burst set are located is determined based on at least one of a quantity of first time units included in one system frame, a time unit, a start position parameter, a multiplexing factor, and a subcarrier spacing parameter, where the first time unit is a time unit determined based on a subcarrier spacing of the control channel.

In some possible implementations, $$k = \left\lfloor \frac{(O \cdot 2^\mu + \lfloor i_{max} \cdot M \rfloor)}{N_{slot}^{frame,\mu}} \right\rfloor,$$

where k is the quantity of the system frames in which the control channel search spaces corresponding to all the common signal blocks in the SSB burst set are located, $i_{max}$ is a maximum index of common signal blocks in the SSB burst set, $N_{slot}^{frame,\mu}$ is the quantity of first time units included in one system frame, the first time unit being the time unit determined based on the subcarrier spacing of the control channel, O represents the start position parameter, M is the multiplexing factor, and µ is the subcarrier spacing parameter.

In some possible implementations, the system frame number satisfies $$\mathrm{mod}(SFN, T_m) = \left\lfloor \frac{(O \cdot 2^\mu + \lfloor i \cdot M \rfloor)}{N_{slot}^{frame,\mu}} \right\rfloor,$$

where SFN represents a system frame number in which a control channel search space corresponding to a common signal block is located, i is an index number of the first common signal block, $T_m$ is the first parameter, $N_{slot}^{frame,\mu}$ is a quantity of slots included in one system frame which corresponds to the subcarrier spacing of the control channel, O represents a time domain offset, and M is a quantity of control channel search spaces in one time unit.

In some possible implementations, a value of M is 1 or ½.

According to a third aspect, a signal monitoring apparatus is provided. The apparatus may be a terminal device, or may be a chip in a terminal device. The apparatus has functions of implementing various implementations according to the first aspect. The functions may be implemented by hardware, or may be implemented by hardware executing corresponding software. The hardware or the software includes one or more units corresponding to the foregoing functions.

In a possible design, when the apparatus is a terminal device, the terminal device includes a processing unit and a transceiver unit. The processing unit may be, for example, a processor, and the transceiver unit may be, for example, a transceiver. The transceiver includes a radio frequency circuit. Optionally, the terminal device further includes a storage unit, and the storage unit may be, for example, a memory. When the terminal device includes the storage unit, the storage unit is configured to store a computer-executable instruction. The processing unit is connected to the storage unit. The processing unit executes the computer-executable instruction stored in the storage unit, so that the terminal device performs the signal monitoring method according to any one of: the first aspect or the possible implementations of the first aspect.

In another possible design, when the apparatus is a chip in a terminal device, the chip includes a processing unit and a transceiver unit. The processing unit may be, for example, a processor, and the transceiver unit may be, for example, an input/output interface, a pin, or a circuit on the chip. The processing unit may execute a computer-executable instruction stored in a storage unit, so that the chip in the terminal device performs the signal monitoring method according to any one of: the first aspect or the possible implementations of the first aspect. Optionally, the storage unit is a storage unit in the chip, for example, a register or a buffer, and the storage unit may alternatively be a storage unit that is in the terminal device and that is outside the chip, for example, a read-only memory (read-only memory, ROM), another type of static storage device that can store static information and an instruction, or a random access memory (random access memory, RAM).

Any one of the processors mentioned above may be a general-purpose central processing unit (CPU), a microprocessor, an application-specific integrated circuit (ASIC), or one or more integrated circuits configured to control program execution in the signal monitoring method according to the first aspect.

According to a fourth aspect, a signal monitoring apparatus is provided. The apparatus may be a network device, or may be a chip in a network device. The apparatus has functions of implementing various embodiments according to the second aspect. The functions may be implemented by hardware, or may be implemented by hardware executing corresponding software. The hardware or the software includes one or more units corresponding to the foregoing functions.

In some possible designs, when the apparatus is a terminal device, the terminal device includes a processing unit and a transceiver unit. The processing unit may be, for example, a processor, and the transceiver unit may be, for example, a transceiver, whereby the transceiver includes a radio frequency circuit. Optionally, the terminal device further includes a storage unit, and the storage unit may be, for example, a memory. When the terminal device includes the storage unit, the storage unit is configured to store a computer-executable instruction. The processing unit is connected to the storage unit. The processing unit executes the computer-executable instruction stored in the storage unit, so that the terminal device performs the signal monitoring method according to any one of: the second aspect or the possible implementations of the second aspect.

In another possible design, when the apparatus is a chip in a terminal device, the chip includes a processing unit and a transceiver unit. The processing unit may be, for example, a processor, and the transceiver unit may be, for example, an input/output interface, a pin, or a circuit on the chip. The processing unit may execute a computer-executable instruction stored in a storage unit, so that the chip in the terminal device performs the signal monitoring method according to any one of the second aspect or the possible implementations of the second aspect. Optionally, the storage unit is a storage unit in the chip, for example, a register or a buffer, and the storage unit may alternatively be a storage unit that is in the terminal device and that is outside the chip, for example, a ROM, another type of static storage device that can store static information and an instruction, or a RAM.

Any one of the processors mentioned above may be a CPU, a microprocessor, an ASIC, or one or more integrated circuits configured to control program execution in the signal monitoring method according to the second aspect.

According to a fifth aspect, a communications system is provided. The communications system includes the apparatus according to the third aspect and the apparatus according to the fourth aspect.

According to a sixth aspect, a computer storage medium is provided. The computer storage medium stores program code, and the program code is used to indicate an instruction used to perform the methods according to any one of the first aspect or the possible implementations of the first aspect and the second aspect or the possible implementations of the second aspect.

According to a seventh aspect, a computer program product including an instruction is provided. When the computer program product is run on a computer, the computer is enabled to perform the methods according to any one of the first aspect or the possible implementations of the first aspect and the second aspect or the possible implementations of the second aspect.

Based on the foregoing solutions, the terminal device determines, based on the configuration information and the first parameter, the index of the first time unit in which the start position of the control channel resource is located. In this way, the terminal device can monitor the control channel starting from the time unit corresponding to the index of the first time unit, to avoid monitoring the control channel extremely early and reduce overheads.

DESCRIPTION OF EMBODIMENTS

The following describes technical solutions of various embodiments with reference to accompanying drawings.

The technical solutions of the embodiments of various embodiments may be applied to various communications systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or an NR system.

A terminal device in the embodiments described herein may be referred to as user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a evolved public land mobile network (PLMN), or the like. This is not limited in the embodiments described herein.

A network device in the embodiments described herein may be a device configured to communicate with the terminal device. The network device may be a base transceiver station (BTS) in the GSM or the CDMA system, or may be a NodeB (NB) in the WCDMA system, or may be an evolved NodeB (eNB or eNodeB) in the LTE system, or may be a radio controller in a cloud radio access network (CRAN) scenario. Alternatively, the network device may be a relay station, an access point, a vehicle-mounted device, a wearable device, a network device in the 5G network, a network device in the evolved PLMN network, or the like. This is not limited in the embodiments contemplated herein.

Figure 1:
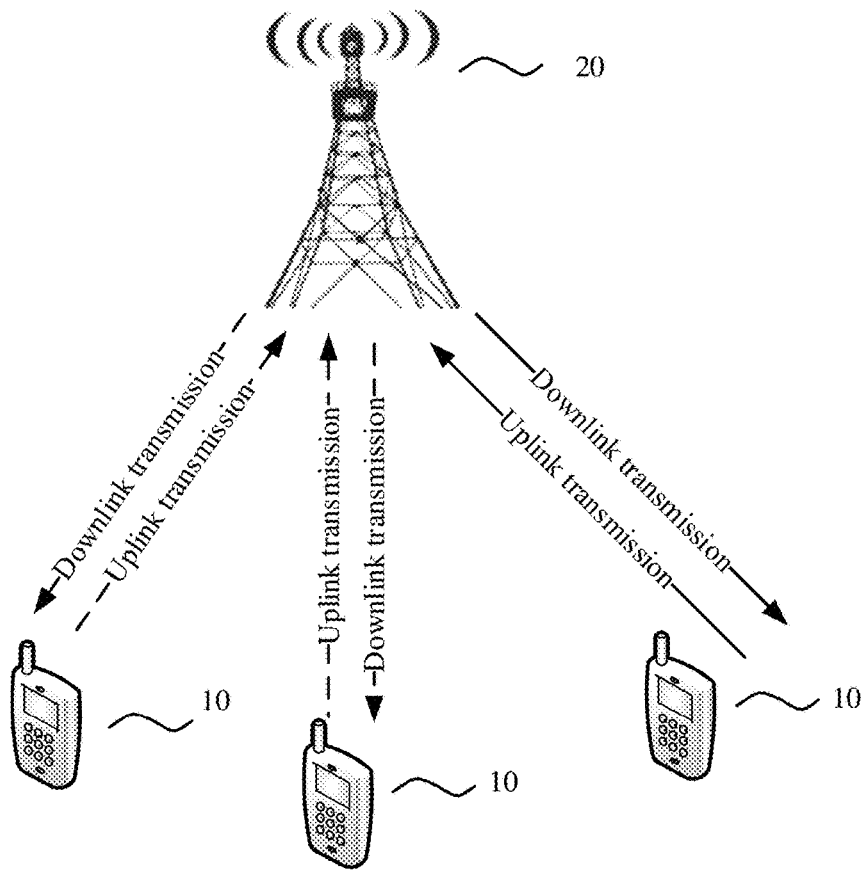
FIG. 1 is a schematic diagram of a communications system as may be contemplated herein.

FIG. 1 is a schematic diagram of a communications system provided herein. The communications system in FIG. 1 may include at least one UE 10 and a network device 20. The network device 20 is configured to provide a communications service for the UE 10 and access a core network. The UE 10 accesses a network by searching for a synchronization signal, a broadcast signal, or the like that is sent by the network device 20, to communicate with the network. An arrow shown in FIG. 1 may indicate uplink/downlink transmission performed by using a cellular link between the UE 10 and the network device 20.

Figure 2:
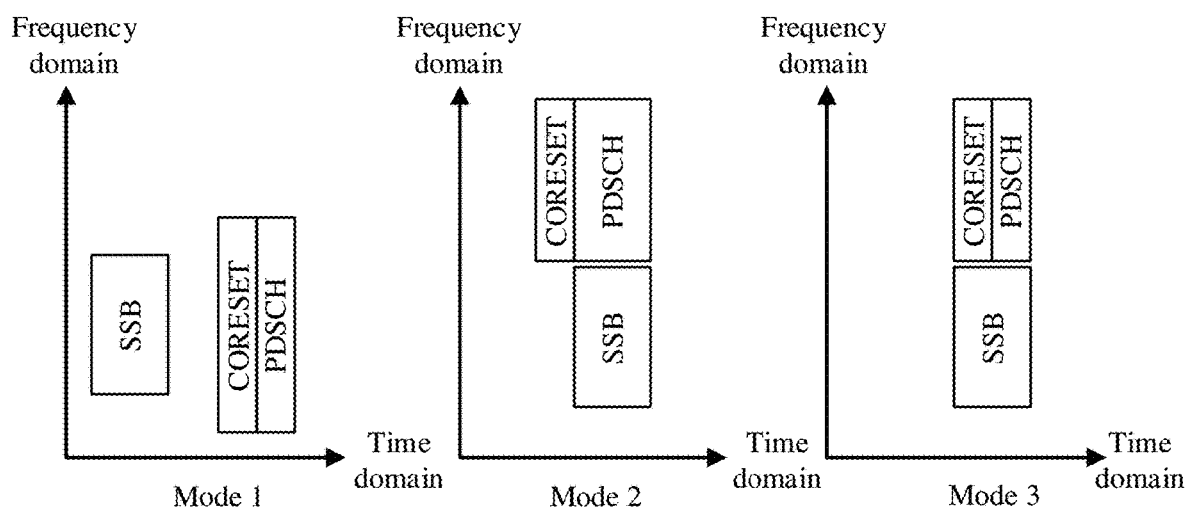
FIG. 2 is a schematic diagram of a configuration pattern of an SSB and an RMSI CORESET/PDSCH.

A configuration pattern of an SSB and an RMSI CORE-SET/PDSCH includes three multiplexing modes, as shown in FIG. 2. In a multiplexing mode 1, the SSB and the RMSI CORESET are located at different moments, and a transmission bandwidth of the SSB partially overlaps with an initial access downlink bandwidth part including the RMSI CORESET. In a multiplexing mode 2, the SSB and the RMSI CORESET are located at different moments, and a transmission bandwidth of the SSB does not overlap with an initial access downlink bandwidth part including the RMSI CORESET. In a multiplexing mode 3, the SSB and the RMSI CORESET are located at a same moment, and a transmission bandwidth of the SSB does not overlap with an initial access downlink bandwidth part including the RMSI CORESET.

In addition, combinations of SSB subcarrier spacings and RMSI CORESET subcarrier spacings that are currently supported by NR include {SSB SCS, RMSI CORESET SCS}={15, 15}, {15, 30}, {30, 15}, {30, 30}, {120, 60}, {120,120}, {240, 60}, {240, 120}}, where the subcarrier spacing may be in a unit of kHz.

In a physical broadcast channel (PBCH), four bits are used to perform joint encoding on the multiplexing pattern of the SSB and the RMSI (CORESET and PDSCH), an RMSI CORESET bandwidth, RMSI CORESET duration, and a frequency domain offset (expressed in quantity of physical resource blocks). The UE selects, based on first four bits of RMSI-PDCCH-config in a sent MIB, a specific quantity of time-frequency resources as the RMSI CORESET according to Table 1 ({SSB SCS, RMSI CORESET SCS}={120, 60}) and Table 2 ({SSB SCS, RMSI CORESET SCS}={240, 120}). Frequency domain offsets in Table 1 and Table 2 each are a frequency difference between a minimum resource block (RB) index of the SSB that is defined by the subcarrier spacing of the RMSI CORESET and a minimum RB index of the RMSI CORESET. Condition A indicates that sizes of precoding resource block groups (PRG) used by the SSB and the RMSI CORESET are the same, and Condition B indicates that sizes of PRGs used by the SSB and the RMSI CORESET are different.

TABLE 1

| Index | Multiplexing mode of an SSB and an RMSI CORESET | Quantity $N_{RB}^{CORESET}$ of RBs | Quantity $N_{symb}^{CORESET}$ of occupied symbols | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 1 | 48 | 3 | 0 |
| 5 | 1 | 48 | 3 | 8 |

TABLE 1-continued

| Index | Multiplexing mode of an SSB and an RMSI CORESET | Quantity $N_{RB}^{CORESET}$ of RBs | Quantity $N_{symb}^{CORESET}$ of occupied symbols | Offset (RBs) |
|---|---|---|---|---|
| 6 | 1 | 96 | 1 | 28 |
| 7 | 1 | 96 | 2 | 28 |
| 8 | 2 | 48 | 1 | −41 if condition A <br> −42 if condition B |
| 9 | 2 | 48 | 1 | 49 |
| 10 | 2 | 48 | 2 | −41 if condition A <br> −42 if condition B |
| 11 | 2 | 48 | 2 | 49 |
| 12 | 2 | 96 | 1 | −41 if condition A <br> −42 if condition B |
| 13 | 2 | 96 | 1 | 97 |
| 14 | 2 | 96 | 2 | −41 if condition A <br> −42 if condition B |
| 15 | 2 | 96 | 2 | 97 |

TABLE 2

| Index | Multiplexing mode of an SSB and an RMSI CORESET | Quantity s $N_{RB}^{CORESET}$ of RB | Occupied symbol $N_{symb}^{CORESET}$ | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | −41 if condition A <br> −42 if condition B |
| 5 | 2 | 24 | 1 | 25 |
| 6 | 2 | 24 | 2 | −41 if condition A <br> −42 if condition B |
| 7 | 2 | 24 | 2 | 25 |
| 8 | 2 | 48 | 1 | −41 if condition A <br> −42 if condition B |
| 9 | 2 | 48 | 1 | 49 |
| 10 | 2 | 48 | 2 | −41 if condition A <br> −42 if condition B |
| 11 | 2 | 48 | 2 | 49 |
| 12 | Reserved (Reserved) | | | |
| 13 | Reserved | | | |
| 14 | Reserved | | | |
| 15 | Reserved | | | |

When the multiplexing mode of the SSB and the RMSI CORESET is mode 1, a time domain configuration of a control channel search space in a scenario in which a carrier frequency is less than or equal to 6 GHz is shown in Table 3, and a time domain configuration of a control channel search space in a scenario in which a carrier frequency is greater than 6 GHz is shown in Table 4.

TABLE 3

| Index | O | Quantity of control channel search spaces in each slot | M | Index of the first symbol |
|---|---|---|---|---|
| 0 | 0 | 1 | 1 | 0 |
| 1 | 0 | 2 | 1 | {0, if i is even}, <br> {$N_{symb}^{CORSET}$, if i is odd} |
| 2 | 2 | 1 | 1 | 0 |
| 3 | 2 | 2 | 1 | {0, if i is even}, <br> {$N_{symb}^{CORSET}$, if i is odd} |
| 4 | 5 | 1 | 1 | 0 |
| 5 | 5 | 2 | 1 | {0, if i is even}, <br> {$N_{symb}^{CORSET}$, if i is odd} |
| 6 | 7 | 1 | 1 | 0 |
| 7 | 7 | 2 | 1 | {0, if i is even}, <br> {$N_{symb}^{CORSET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

TABLE 4

| Index | O | Quantity of control channel search spaces in each slot | M | Index of the first symbol |
|---|---|---|---|---|
| 0 | 0 | 1 | 1 | 0 |
| 1 | 0 | 2 | 1 | {0, if i is even}, <br> {7, if i is odd} |
| 2 | 2.5 | 1 | 1 | 0 |
| 3 | 2.5 | 2 | 1 | {0, if i is even}, <br> {7, if i is odd} |
| 4 | 5 | 1 | 1 | 0 |
| 5 | 5 | 2 | 1 | {0, if i is even}, <br> {7, if i is odd} |
| 6 | 0 | 2 | 1 | {0, if i is even}, <br> {$N_{symb}^{CORESET}$, if i is odd} |
| 7 | 2.5 | 2 | 1 | {0, if i is even}, <br> {$N_{symb}^{CORESET}$, if i is odd} |
| 8 | 5 | 2 | 1 | {0, if i is even}, <br> {$N_{symb}^{CORESET}$, if i is odd} |
| 9 | 7.5 | 1 | 1 | 0 |
| 10 | 7.5 | 2 | 1 | {0, if i is even}, <br> {7, if i is odd} |
| 11 | 7.5 | 2 | 1 | {0, if i is even}, <br> {$N_{symb}^{CORESET}$, if i is odd} |
| 12 | 0 | 1 | 2 | 0 |
| 13 | 5 | 1 | 2 | 0 |
| 14 | Reserved | | | |
| 15 | Reserved | | | |

When the multiplexing mode of the SSB and the RMSI CORESET is the mode 1, in a scenario in which a carrier frequency is greater than 6 GHz, because a maximum quantity of SSBs included in one SSB burst set is L=64, as shown in Table 4, for Configuration Index=4, 5, 8, 9, 10, 11, 12, and 13, a quantity of system frames in which control channel search spaces (search space) associated with some SSBs in an SSB monitoring window are located may exceed 2 (20 ms), that is, a quantity of system frames in which control channel search spaces associated with the first SSB to an $i^{th}$ SSB are located may be $\lfloor (O \cdot 2^\mu) + \lfloor i \cdot M \rfloor \rfloor / N_{slot}^{frame,\mu} \rfloor > 1$. In this case, according to a current NR protocol, a system frame number (SFN) corresponding to a control channel search space associated with the SSB cannot be determined. Therefore, the UE cannot monitor a control channel.

A common signal block may be an SSB. The SSB burst set is a time period in which a maximum quantity of SSBs that can be transmitted are carried on a carrier frequency, for example, a half-frame, or another time period shorter than a half-frame. This is not specifically limited herein. Optionally, the SSB burst set may include a plurality of synchronization signals/broadcast channel blocks.

It should be understood that "control channel search space" and "RMSI CORESET monitoring window" are not distinguished in the following embodiments.

Figure 3:
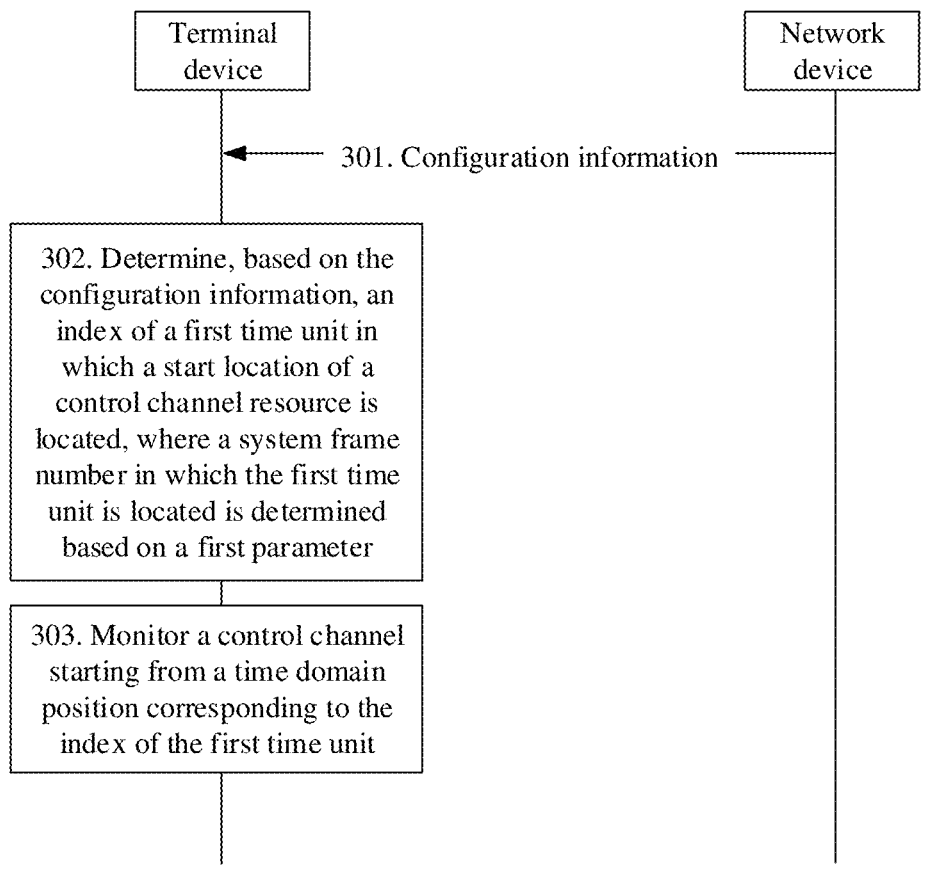
FIG. 3 is a schematic flowchart of a signal monitoring method according to an embodiment provided herein.

FIG. 3 is a schematic flowchart of a signal monitoring method according to an embodiment as contemplated herein.

301. A terminal device receives configuration information. Correspondingly, a network device determines the configuration information, and sends the configuration information to the terminal device.

Optionally, the configuration information may include a start position parameter, a multiplexing factor, a subcarrier spacing parameter, and the like. A first time unit is a time unit determined based on a subcarrier spacing of a control channel.

It should be understood that the first time unit may be a subframe, a slot, an OFDM symbol, or the like.

302. The terminal device determines, based on the configuration information, an index of the first time unit in which a start position of the control channel resource is located, where a system frame number in which the first time unit is located is determined based on a first parameter.

Specifically, the terminal device determines the index of the first time unit that is of the start position of the control channel resource and that is in the system frame number based on the configuration information and the first parameter. The system frame number in which the first time unit is located may be a system frame number corresponding to an index representing the first time unit, or may be a system frame number of a system frame in which the first time unit is located.

Optionally, the first parameter is a parameter related to a monitoring period of a control channel search space or a monitoring period of a control channel resource. Optionally, a value of the monitoring period may be 20 ms, 30 ms, 40 ms, or the like. The first parameter corresponding to the monitoring period is 2, 3, 4, or the like.

Alternatively, the first parameter may be a parameter related to a quantity of system frames in which control channel search spaces corresponding to all common signal blocks in an SSB burst set are located, and a corresponding value of the first parameter is 2, 3, 4, or the like.

Optionally, the first parameter may be determined based on a relationship between the quantity of the system frames in which the control channel search spaces corresponding to all the common signal blocks in the SSB burst set are located and a first preset system frame quantity.

Specifically, each SSB corresponds to one control channel search space, and the terminal device may determine system frames in which start resources of the control channel search spaces corresponding to all the SSBs in the SSB burst set are located. To be specific, the terminal device may learn of a quantity of system frames covered by the start resource positions of the control channel search spaces corresponding to all the SSBs in the SSB burst set. The terminal device may determine the first parameter based on the relationship between the quantity of system frames and the first preset system frame quantity. For example, the terminal device may separately determine specific values of the first parameter corresponding to different multiples of the first preset system frame quantity.

It should be understood that the control channel search space in this embodiment as provided herein may also be referred to as an "RMSI CORESET monitoring window (RMSI CORESET monitoring window)". The control channel may be a control channel of system information, for example, an RMSI CORESET or an OSI CORESET; or may be a control channel of a paging channel; or a control channel of a random access response. This is not specifically limited herein.

It should be understood that the same terms in the embodiments provided herein have the same meaning. In order to avoid repetition, it may be understood that the terms are not limited.

Optionally, a quantity k of system frames in which control channel resources corresponding to all the common signal blocks in the SSB burst set are located is determined based on at least one of a quantity of first time units included in one system frame, a start position parameter, a multiplexing factor, and a subcarrier spacing parameter, where the first time unit is a time unit determined based on a subcarrier spacing of the control channel.

Specifically, the terminal device may determine, based on the quantity of first time units included in one system frame, the start position parameter, the multiplexing factor, and the subcarrier spacing parameter, the quantity k of system frames in which the control channel resources corresponding to all the common signal blocks in the SSB burst set are located, the first time unit being the time unit determined based on a subcarrier spacing of the control channel. For example, there is a mapping relationship between any two of the plurality of parameters. In this way, the terminal device may determine a value of another parameter based on one of the plurality of parameters, and then, determine k.

Optionally, the quantity of system frames in which the control channel search spaces corresponding to all the common signal blocks in the SSB burst set are located is determined based on the following formula:

$$k = \lfloor (O \cdot 2^\mu + \lfloor i_{max} \cdot M \rfloor) / N_{slot}^{frame,\mu} \rfloor, \text{ where}$$

$i_{max}$ is a maximum index of common signal blocks in the SSB burst set, $N_{slot}^{frame,\mu}$ is a quantity of first time units included in one system frame, the first time unit being the time unit determined based on the subcarrier spacing of the control channel, O represents the start position parameter, M is the multiplexing factor, and μ is the subcarrier spacing parameter.

Specifically, if indexes of the common signal blocks in the SSB burst set are numbered from 0, when a maximum quantity of common signal blocks in the SSB burst set is a, $i_{max}=a-1$. If the indexes of the common signal blocks in the SSB burst set are numbered from 1, when a maximum quantity of common signal blocks in the SSB burst set is a, $i_{max}=a$.

Optionally, the first parameter may be a first value or a second value, and the first value is greater than the second value. In this way, when the quantity of system frames is greater than the first preset system frame quantity, a value of the first parameter may be the first value. When the quantity of system frames is less than or equal to the first preset system frame quantity, a value of the first parameter may be the second value.

It should be understood that, alternatively, when the quantity of system frames is greater than the first preset system frame quantity, the value of the first parameter may be the first value; or when the quantity of system frames is less than or equal to the first preset system frame quantity, the value of the first parameter may be the second value.

Optionally, the first preset system frame quantity may be 1.

Optionally, the first parameter may be 2 or 4.

Optionally, the first parameter may be $T_m$. For example, $T_m$ corresponds to two frames (20 ms), $T_m$ corresponds to three frames (30 ms), or $T_m$ corresponds to four frames (40 ms).

For example, descriptions are provided by using an example in which the first value is 4 and the second value is 2:

if $\lfloor (O \cdot 2^\mu + \lfloor i_{max} \cdot M \rfloor)/N_{slot}^{frame,\mu} \rfloor \leq 1, T_m = 2$; or if $\lfloor (O \cdot 2^\mu + \lfloor i_{max} \cdot M \rfloor)/N_{slot}^{frame,\mu} \rfloor > 1, T_m = 4$.

More specifically, when a subcarrier spacing of the SSB is 120 kHz, and a subcarrier spacing of the RMSI is 60 kHz, that is, V is 4=60/15, when a configuration index 13 in Table 4 is used, a corresponding time domain offset O is 5 ms, M=2, and an OFDM symbol sequence number at the start position of the control channel resource is 0. It is assumed that a maximum sequence number corresponding to an SSB transmitted in an SSB burst set is $i_{max}=63$. The following formula may be obtained:

$\lfloor (O \cdot 2^\mu + \lfloor i_{max} \cdot M \rfloor)/N_{slot}^{frame,\mu} \rfloor = 3$ In other words, the quantity of system frames in which the control channel search spaces corresponding to all the common signal blocks in the SSB burst set are located exceeds 2. In this case, $T_m = 4$.

Optionally, the first parameter may have three possible values: a first value, a second value, and a third value.

For example, the first parameter may be 2, 3, or 4.

Optionally, the value of the first parameter may be determined according to $\lfloor (O \cdot 2^\mu + \lfloor i_{max} \cdot M \rfloor)/N_{slot}^{frame,\mu} \rfloor$.

Specifically, if $\lfloor (O \cdot 2^\mu + \lfloor i_{max} \cdot M \rfloor)/N_{slot}^{frame,\mu} \rfloor \leq 1$, $T_m = 2$;

if $\lfloor (O \cdot 2^\mu + \lfloor i_{max} \cdot M \rfloor)/N_{slot}^{frame,\mu} \rfloor = 2, T_m = 3$; or if $\lfloor (O \cdot 2^\mu + \lfloor i_{max} \cdot M \rfloor)/N_{slot}^{frame,\mu} \rfloor > 2, T_m = 4$.

Optionally, a system frame number in which a start position of a control channel search space corresponding to an SSB whose index number is i in the SSB burst set can meet mod $(SFN, T_m) = \lfloor (O \cdot 2^\mu + \lfloor i \cdot M \rfloor)/N_{slot}^{frame,\mu} \rfloor$, where SFN represents a system frame number in which a control channel search space corresponding to a common signal block is located, i is an index number of the common signal block, $T_m$ is the first parameter, $N_{slot}^{frame,\mu}$ is the quantity of first time units included in one system frame, the first time unit being the time unit determined based on the subcarrier spacing of the control channel, O represents the start position parameter, M is the multiplexing factor, and μ is the subcarrier spacing parameter.

Optionally, the terminal device may further determine, based on the configuration information, the index of the first time unit in which the start position of the control channel resource is located.

Specifically, the terminal device may determine the index of the first time unit based on the quantity of first time units included in one system frame, the first time unit being the time unit determined based on the subcarrier spacing of the control channel, the start position parameter, the multiplexing factor, and the subcarrier spacing parameter, that is $n_0 = ((O \cdot 2^\mu + \lfloor i \cdot M \rfloor) \mod N_{slot}^{frame,\mu})$, where i is an index number of the common signal block, $T_m$ is the first parameter, $N_{slot}^{frame,\mu}$ is the quantity of first time units included in one system frame, the first time unit being the time unit determined based on the subcarrier spacing of the control channel, O represents the start position parameter, M is the multiplexing factor, and μ is the subcarrier spacing parameter.

For example, for an SSB whose sequence number is i=40 in the SSB burst set, $\lfloor (O \cdot 2^\mu + \lfloor i \cdot M \rfloor)/N_{slot}^{frame,\mu} \rfloor = 2$ may be obtained through calculation. The system frame number (SFN) in which a control channel search space associated with the sequence number satisfies mod (SFN, 4)=2. Correspondingly, a sequence number of the first slot in the control channel search space is $n_0 = ((O \cdot 2^\mu + \lfloor i \cdot M \rfloor) \mod N_{slot}^{frame,\mu})$.

303. The terminal device monitors the control channel starting from a time domain position corresponding to the index of the first time unit.

Specifically, the first time unit may be a subframe, a slot, an OFDM symbol, or the like, and correspondingly, the time domain position is a subframe, a slot, or an OFDM symbol. An example in which the first time unit is a slot is used for description. The time domain position may alternatively be a slot position. The terminal device may start monitoring from the first slot $n_0$ in the control channel search space, for example, monitor the slot $n_0$ and a slot $n_0+1$. A complete method for monitoring the control channel by the terminal device is shown as follows:

The terminal device determines, based on the configuration information and the first parameter, the index of the first time unit in which the start position of the control channel resource is located, and a frame number of a system frame in which the first time unit is located satisfies the following formula:

$\mod(SFN, T_m) = \lfloor (O \cdot 2^\mu + \lfloor i \cdot M \rfloor)/N_{slot}^{frame,\mu} \rfloor$, where SFN represents a system frame number in which a control channel search space corresponding to a first common signal block is located, i is an index number of the first common signal block, $T_m$ is the first parameter, $N_{slot}^{frame,\mu}$ is a quantity that is of slots included in one system frame and that is corresponding slot to the subcarrier spacing of the control channel, O represents a time domain offset, and M is a quantity of control channel search spaces in one time unit; and if $\lfloor (O \cdot 2^\mu + \lfloor i_{max} \cdot M \rfloor)/N_{slot}^{frame,\mu} \rfloor \leq 1, T_m = 2$; or if $(O \cdot 2^\mu + \lfloor i_{max} \cdot M \rfloor)/N_{slot}^{frame,\mu} \rfloor > 1, T_m = 4$, where $i_{max}$ is a maximum index of common signal blocks in the SSB burst set.

The terminal device monitors the control channel starting from the time domain position corresponding to the index of the first time unit.

Therefore, according to the signal monitoring method in this embodiment such as is described herein, the terminal device determines, based on the configuration information and the first parameter, the index of the first time unit in which the start position of the control channel resource is located. In this way, the terminal device can monitor the control channel starting from the time unit corresponding to the index of the first time unit, to avoid monitoring the control channel extremely early and reduce overheads.

In a conventional solution, for a multiplexing pattern 1 of an SSB and an RMSI CORESET, a value of a parameter M in a time domain configuration table (as shown in Table 4) of an RMSI CORESET corresponding to a scenario in which a carrier frequency is greater than 6 GHz is set to 1 or 2. Parameter configuration flexibility is relatively low.

In another embodiment described herein, the terminal device may determine the multiplexing factor M based on a relationship between duration of the control channel resource and a preset duration threshold.

Specifically, for the multiplexing pattern 1 of the SSB and the RMSI CORESET, an option M=½ is added to a parameter M in configurations 5, 8, 10, and 11 in a time domain configuration table (as shown in Table 4) of an RMSI CORESET corresponding to a scenario in which a carrier frequency is greater than 6 GHz, to form an optional set M∈{$M_0$, ½}, as shown in Table 5. $M_0$ indicates an existing value of the parameter M in the time domain configuration table of the control channel search space corresponding to the scenario in which the carrier frequency is greater than 6 GHz in the existing protocol.

TABLE 5

| Index | O | Quantity of control channel search spaces in each slot | M | Index of the first symbol |
|---|---|---|---|---|
| 0 | 0 | 1 | 1 | 0 |
| 1 | 0 | 2 | 1 | {0, if i is even}, {7, if i is odd} |
| 2 | 2.5 | 1 | 1 | 0 |
| 3 | 2.5 | 2 | 1 | {0, if i is even}, {7, if i is odd} |
| 4 | 5 | 1 | 1 | 0 |
| 5 | 5 | 2 | {1, ½} | {0, if i is even}, {7, if i is odd} |
| 6 | 0 | 2 | 1 | {0, if i is even {$N_{symb}^{CORESET}$, if i is odd} |
| 7 | 2.5 | 2 | 1 | {0, if i is even}, {$N_{symb}^{CORESET}$, if i is odd} |
| 8 | 5 | 2 | {1, ½} | {0, if i is even}, {$N_{symb}^{CORESET}$, if i is odd} |
| 9 | 7.5 | 1 | 1 | 0 |
| 10 | 7.5 | 2 | {1, ½} | {0, if i is even}, {7, if i is odd} |
| 11 | 7.5 | 2 | {1, ½} | {0, if i is even}, {$N_{symb}^{CORESET}$, if i is odd} |
| 12 | 0 | 1 | 2 | 0 |
| 13 | 5 | 1 | 2 | 0 |
| 14 | | | Reserved | |
| 15 | | | Reserved | |

For the multiplexing pattern 1 of the SSB and the RMSI CORESET, an option M=½ is added to a parameter M in configurations 1, 3, 5, and 7 in a time domain configuration table (as shown in Table 3) of an RMSI CORESET corresponding to a scenario in which a carrier frequency is less than or equal to 6 GHz, to form an optional set M∈{1, ½}, as shown in Table 6.

TABLE 6

| Index | O | Quantity of control channel search spaces in each slot | M | Index of the first symbol |
|---|---|---|---|---|
| 0 | 0 | 1 | 1 | 0 |
| 1 | 0 | 2 | {1, ½} | {0, if i is even}, {$N_{symb}^{CORESET}$, if i is odd} |
| 2 | 2 | 1 | 1 | 0 |
| 3 | 2 | 2 | {1, ½} | {0, if i is even}, {$N_{symb}^{CORESET}$, if i is odd} |
| 4 | 5 | 1 | 1 | 0 |
| 5 | 5 | 2 | {1, ½} | {0, if i is even}, {$N_{symb}^{CORESET}$, if i is odd} |
| 6 | 7 | 1 | 1 | 0 |
| 7 | 7 | 2 | {1, ½} | {0, if i is even}, {$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

For the multiplexing pattern 1 of the SSB and the RMSI CORESET, an option M=½ is added to a parameter M in configurations 1, 3, 5, 6, 7, 8, 9, 10 and 11 in a time domain configuration table (as shown in Table 4) of an RMSI CORESET monitoring window corresponding to a scenario in which a carrier frequency is greater than 6 GHz, to form an optional set M∈{1, ½}, as shown in Table 7.

TABLE 7

| Index | O | Quantity of control channel search spaces in each slot | M | Index of the first symbol |
|---|---|---|---|---|
| 0 | 0 | 1 | 1 | 0 |
| 1 | 0 | 2 | {1, ½} | {0, if i is even}, {7, if i is odd} |
| 2 | 2.5 | 1 | 1 | 0 |
| 3 | 2.5 | 2 | {1, ½} | {0, if i is even}, {7, if i is odd} |
| 4 | 5 | 1 | 1 | 0 |
| 5 | 5 | 2 | {1, ½} | {0, if i is even}, {7, if i is odd} |
| 6 | 0 | 2 | {1, ½} | {0, if i is even}, {$N_{symb}^{CORESET}$, if i is odd} |
| 7 | 2.5 | 2 | {1, ½} | {0, if i is even}, {$N_{symb}^{CORESET}$, if i is odd} |
| 8 | 5 | 2 | {1, ½} | {0, if i is even}, {$N_{symb}^{CORESET}$, if i is odd} |
| 9 | 7.5 | 1 | 1 | 0 |
| 10 | 7.5 | 2 | {1, ½} | {0, if i is even}, {7, if i is odd} |
| 11 | 7.5 | 2 | {1, ½} | {0, if i is even}, {$N_{symb}^{CORESET}$, if i is odd} |
| 12 | 0 | 1 | 2 | 0 |
| 13 | 5 | 1 | 2 | 0 |
| 14 | | | Reserved | |
| 15 | | | Reserved | |

Optionally, the terminal device determines that the value of M is the first quantity when the duration of the control channel resource is greater than the preset duration threshold; or the terminal device determines that the value of M is the second quantity when the duration of the control channel resource is less than or equal to the preset duration threshold.

Specifically, if a value set of the parameter M is M∈{1, ½}, the parameter is selected from the optional set in the following manner based on the duration $N_{symb}^{CORSET}$ of the RMSI CORESET: if P=2 and the duration of the RMSI CORESET duration is 1, M=½; or if P=2, and the duration of the RMSI CORESET is {2, 3}, M=1, where P is a quantity of control channel search spaces in each slot in Table 6 and Table 7.

Optionally, the terminal device determines the multiplexing factor M based on the relationship between the quantity of the system frames in which the control channel search spaces corresponding to all the common signal blocks in the SSB burst set are located and a second preset system frame quantity.

Optionally, the terminal device determines that the value of M is the second quantity when the quantity of the system frames in which the control channel search spaces corresponding to all the common signal blocks in the SSB burst set are located is greater than the second preset system frame quantity; or the terminal device determines that the value of M is the first quantity when the quantity of the system frames in which the control channel search spaces corresponding to all the common signal blocks in the SSB burst set are located is less than or equal to the second preset system frame quantity.

Optionally, the first quantity is 1, the second quantity is ½, and the second preset system frame quantity is 1.

Specifically, when the value set of the parameter M is $M \in \{M_0, \frac{1}{2}\}$, determining is performed depending on whether time domain start positions of RMSI CORESETs associated with all sent SSBs in the SSB burst set are included in two system frames. If the time domain start positions of the RMSI CORESETs associated with all the sent SSBs in the SSB burst set are included in twos system frames, that is $\lfloor (O \cdot 2^{\mu} + \lfloor i_{max} \cdot M \rfloor)/N_{slot}^{frame,\mu} \rfloor \leq 1$, $M=M_0$. If time domain start positions of the RMSI CORESETs associated with all the sent SSBs in the SSB burst set are included in more than two system frames, that is $\lfloor (O \cdot 2^{\mu} + \lfloor i_{max} \cdot M \rfloor)/N_{slot}^{frame,\mu} \rfloor > 1$, $M=\frac{1}{2}$. That is:

$$M = \begin{cases} M_0, & \lfloor (O \cdot 2^{\mu} + \lfloor i_{max} \cdot M \rfloor)/N_{slot}^{frame,\mu} \rfloor \leq 1 \\ \frac{1}{2}, & \lfloor (O \cdot 2^{\mu} + \lfloor i_{max} \cdot M \rfloor)/N_{slot}^{frame,\mu} \rfloor > 1 \end{cases}.$$

It should be understood that the specific examples in the embodiments provided herein are merely intended to help a person skilled in the art better understand the embodiments provided herein, rather than limit the scope of the embodiments provided herein.

It should be understood that sequence numbers of the foregoing processes do not mean execution sequences in various embodiments provided herein. The execution sequences of the processes should be determined according to functions and internal logic of the processes, and should not be construed as any limitation on the implementation processes of the embodiments provided herein.

The foregoing describes in detail the signal monitoring method according to the embodiments provided herein. The following describes a signal monitoring apparatus according to the embodiments provided herein.

Figure 4:
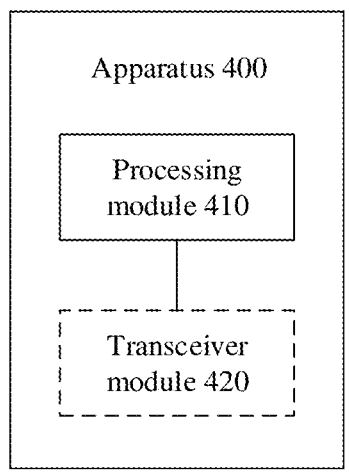
FIG. 4 is a schematic block diagram of a signal monitoring apparatus according to an embodiment provided herein.

FIG. 4 is a schematic block diagram of a signal monitoring apparatus 400 according to an embodiment provided herein.

It should be understood that the signal monitoring apparatus 400 may correspond to the terminal device in the method embodiment, and may have any function of the terminal device in the method.

A processing module 410 is configured to determine, based on received configuration information, an index of a first time unit in which a start position of a control channel resource is located, where a system frame number in which the first time unit is located is determined based on a first parameter.

The processing module 410 is further configured to monitor the control channel starting from a time domain position corresponding to the index of the first time unit.

Optionally, the signal monitoring apparatus 400 in this embodiment as described herein may be a terminal device, or may be a chip in a terminal device.

It should be understood that the signal monitoring apparatus 400 according to this embodiment as described herein may correspond to the terminal device in the signal monitoring method in the embodiment in FIG. 3. In addition, the foregoing management operations and/or functions and other management operations and/or functions of the modules in the signal monitoring apparatus 400 are separately used to implement corresponding steps of the foregoing method. For brevity, details are not described herein again.

Figure 5:
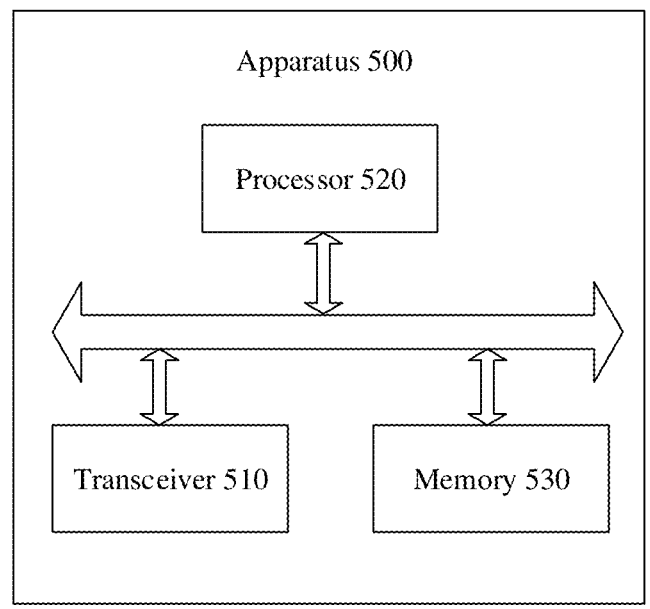
FIG. 5 is a schematic structural diagram of a signal monitoring apparatus according to an embodiment provided herein.

Optionally, if the signal monitoring apparatus 400 is a terminal device, a transceiver module 420 in this embodiment as described herein may be implemented by a transceiver 510, and the processing module 410 may be implemented by a processor 520. As shown in FIG. 5, a signal monitoring apparatus 500 may include a transceiver 510, a processor 520, and a memory 530. The memory 530 may be configured to store indication information, and may be further configured to store code, an instruction, or the like that is executed by the processor 520. The transceiver 510 may include a radio frequency circuit. Optionally, the terminal device further includes a storage unit.

For example, the storage unit may be a memory. When the terminal device includes the storage unit, the storage unit is configured to store a computer-executable instruction. The processing module is connected to the storage unit. The processing module executes the computer-executable instruction stored in the storage unit, so that the terminal device performs the foregoing signal monitoring method.

Optionally, if the signal monitoring apparatus 400 is a chip in a terminal device, the chip includes a processing module 410 and a transceiver module 420. The transceiver module 420 may be implemented by a transceiver 510, and the processing module 410 may be implemented by a processor 520. The transceiver module may be, for example, an input/output interface, a pin, or a circuit. The processing module may execute a computer-executable instruction stored in a storage unit. The storage unit is a storage unit in the chip, for example, a register or a buffer, and the storage unit may alternatively be a storage unit that is in the terminal device and that is outside the chip, for example, a read-only memory (read-only memory, ROM), another type of static storage device that can store static information and instructions, or a random access memory (random access memory, RAM).

Figure 6:
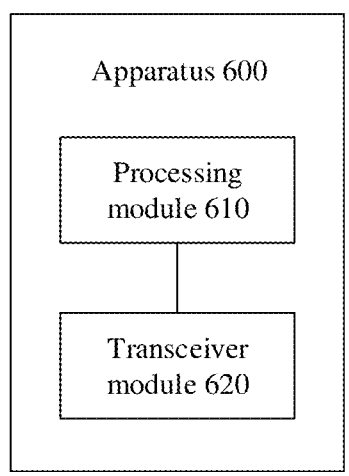
FIG. 6 is a schematic block diagram of a signal monitoring apparatus according to another embodiment provided herein.

FIG. 6 shows a signal monitoring apparatus 600 according to an embodiment as described herein. The signal monitoring apparatus 600 may be the foregoing network device.

It should be understood that the signal monitoring apparatus 600 may correspond to the network device in the method embodiment, and may have any function of the network device in the method.

The signal monitoring apparatus 600 includes a processing module 610, configured to determine configuration information, where the configuration information is used to determine an index of a first time unit in which a start position of a control channel resource is located, and a system frame number in which the first time unit is located is determined based on a first parameter; and a transceiver module 620, configured to send the configuration information.

Optionally, the signal monitoring apparatus 600 in this embodiment as described herein may be a network device, or may be a chip in a network device.

It should be understood that the signal monitoring apparatus 600 according to this embodiment as provided herein may correspond to the network device in the signal monitoring method in the embodiment in FIG. 3. In addition, the foregoing management operations and/or functions and other management operations and/or functions of the modules in the signal monitoring apparatus 600 are separately used to implement corresponding steps of the foregoing method. For brevity, details are not described herein again.

Figure 7:
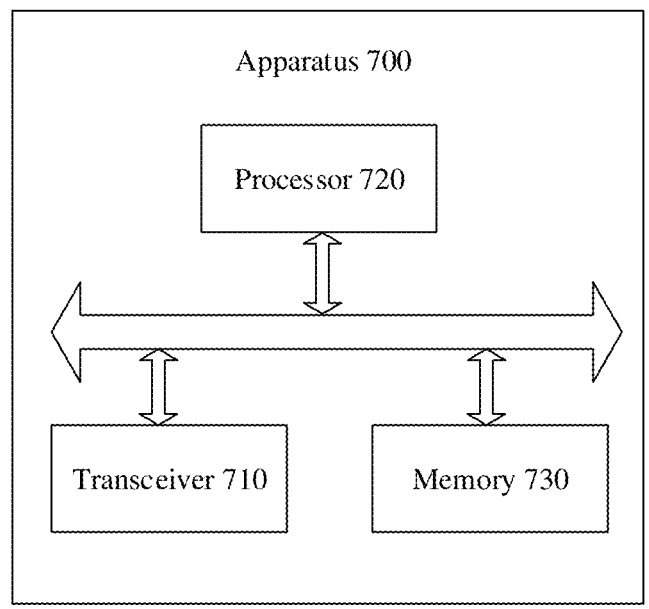
FIG. 7 is a schematic structural diagram of a signal monitoring apparatus according to another embodiment provided herein.

Optionally, if the signal monitoring apparatus 600 is a network device, the transceiver module 620 in this embodiment as provided herein may be implemented by a transceiver 710, and the processing module 610 may be implemented by a processor 720. As shown in FIG. 7, an apparatus 700 may include a transceiver 710, a processor 720, and a memory 730. The memory 730 may be configured to store indication information, and may be further configured to store code, an instruction, and the like executed by the processor 720. The transceiver may include a radio frequency circuit. Optionally, the network device further includes a storage unit.

For example, the storage unit may be a memory. When the network device includes the storage unit, the storage unit is configured to store a computer-executable instruction. The processing module is connected to the storage unit. The processing module executes the computer-executable instruction stored in the storage unit, so that the network device performs the foregoing signal monitoring method.

Optionally, if the signal monitoring apparatus 600 is a chip in a network device, the chip includes a processing module 620 and a transceiver module 610. The transceiver module 610 may be, for example, an input/output interface, a pin, or a circuit on the chip. The processing module 620 may execute the computer-executable instruction stored in the storage unit.

Optionally, the storage unit is a storage unit in the chip, for example, a register or a buffer, or the storage unit may be a storage unit that is in the network device and that is outside the chip, for example, a read-only memory (ROM), another type of static storage device that can store static information and instructions, or a random access memory (RAM). The storage unit is a storage unit in the chip, for example, a register or a buffer, and the storage unit may alternatively be a storage unit that is in the network device and that is outside the chip, for example, a ROM, another type of static storage device that can store static information and instructions, or a RAM.

It should be understood that the processor 620 or the processor 720 may be an integrated circuit chip with a signal processing capability. In an implementation process, steps in the foregoing method embodiment can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments as described herein. The general purpose processor may be a microprocessor, or the processor may be any conventional processor or the like. Steps of the methods disclosed with reference to the embodiments as described herein may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory 630 or the memory 730 in the embodiments as described herein may be a volatile memory or a nonvolatile memory, or may include both a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a RAM, used as an external cache. Through example but not limitative description, many forms of RAMs may be used, for example, a static random access memory (SRAM), a dynamic random access memory (DRAM), a synchronous dynamic random access memory (Synchronous DRAM, or SDRAM), a double data rate synchronous dynamic random access memory (Double Data Rate SDRAM, or DDR SDRAM), an enhanced synchronous dynamic random access memory (Enhanced SDRAM, or ESDRAM), a synchronous link dynamic random access memory (Synch Link DRAM, or SLDRAM), and a direct rambus dynamic random access memory (Direct Rambus RAM, or DR RAM). It should be noted that the memory of the systems and methods described in this specification includes but is not limited to these and any memory of another proper type.

Figure 8:
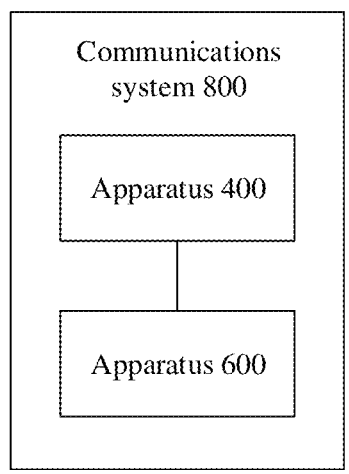
FIG. 8 is a schematic block diagram of a communications system according to an embodiment provided herein.

FIG. 8 shows a communications system 800 according to an embodiment as provided herein. The communications system 800 includes the signal monitoring apparatus 400 in the embodiment shown in FIG. 4 and the signal monitoring apparatus 600 in the embodiment shown in FIG. 6.

An embodiment as provided herein further provides a computer storage medium, and the computer storage medium may store a program instruction for indicating any one of the foregoing methods.

Optionally, the storage medium may be specifically the memory 530 or the memory 730.

An embodiment as described herein further provides a chip system. The chip system includes a processor, configured to support a distributed unit, a centralized unit, a terminal device, and a network device in implementing a function in the foregoing embodiment, for example, generating or processing data and/or information in the foregoing method.

In a possible design, the chip system further includes a memory. The memory is configured to store a program instruction and data that are necessary for the distributed unit, the centralized unit, the terminal device, and the network device. The chip system may include a chip, or may include a chip and another discrete device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the set of embodiments described herein.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided herein, it should be understood that the disclosed system, apparatus, and method may be implemented in other manners. For example, the described apparatus embodiment is merely an example. For example, the unit division is merely logical function division and another division configuration may be used in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments as described herein may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions provided herein essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments provided herein. The foregoing storage medium includes: any medium that can store program code, such as a USB flash drive, a removable hard disk, a ROM, a RAM, a magnetic disk, or an optical disc.

The foregoing descriptions are merely specific implementations of this subject matter, but are not intended to limit the protection scope of this subject matter. Any variation or replacement readily figured out by a person skilled in the art within the technical scope of this disclosure shall fall within the contemplated scope of protection. Therefore, the scope of protection of this disclosure shall be subject to the scope of protection of the claims.

The invention claimed is:

1. A method comprising:
   determining, by a terminal device based on received configuration information, an index of a first time unit in which a start position of a control channel resource of a control channel is located, wherein a system frame number in which the first time unit is located is determined based on a first parameter and the terminal device determines the first parameter based on a relationship between a quantity of system frames in which control channel search spaces corresponding to all common signal blocks in a synchronization signal/broadcast channel block (SSB) burst set are located and a first preset system frame quantity and each SSB corresponds to one control channel search space; and
   monitoring, by the terminal device, the control channel starting from a time domain position corresponding to the index of the first time unit,
   wherein the first parameter is a first value or a second value, the second value is less than the first value, and the first parameter is the first value when the quantity of system frames is greater than the first preset system frame quantity, and the first parameter is the second value when the quantity of system frames is less than or equal to the first preset system frame quantity.

2. The method according to claim 1, wherein the first value is 4 and the second value is 2.

3. The method according to claim 1, wherein the first preset system frame quantity is 1.

4. The method according to claim 1, wherein the quantity of the system frames in which control channel search spaces corresponding to all common signal blocks in a synchronization signal/broadcast channel block (SSB) burst set are located is further determined based on at least one of a quantity of first time units comprised in one system frame, a start position parameter, a multiplexing factor, and a subcarrier spacing parameter, and the first time unit is a time unit determined based on the subcarrier spacing parameter.

5. The method according to claim 4, wherein the determination is based on a relation $k = \lfloor (O \cdot 2^{\mu} + \lfloor i_{max} \cdot M \rfloor) / N_{slot}^{frame,\mu} \rfloor$, k is the quantity of the system frames in which the control channel search spaces corresponding to all the common signal blocks in the SSB burst set are located, $i_{max}$ is a maximum index of common signal blocks in the SSB burst set, $N_{slot}^{frame,\mu}$ is the quantity of first time units comprised in one system frame, O represents the start position parameter, M is the multiplexing factor, and y is the subcarrier spacing parameter.

6. The method according to claim 1, wherein the system frame number satisfies $\mathrm{mod}(SFN, T_m) = \lfloor (O \cdot 2^{\mu} + \lfloor i \cdot M \rfloor) / N_{slot}^{frame,\mu} \rfloor$, SFN represents a system frame number in which a control channel search space corresponding to a common signal block is located, i is an index number of the common signal block, $T_m$ is the first parameter, $N_{slot}^{frame,\mu}$ is a quantity of first time units comprised in one system frame, the first time unit being a time unit determined based on the subcarrier spacing of the control channel, O represents a start position parameter, M is a multiplexing factor, and $\mu$ is a subcarrier spacing parameter.

7. The method according to claim 1, comprising:
   determining, by the terminal device, a multiplexing factor M based on a relationship between duration of the control channel resource and a preset duration threshold; or
   determining, by the terminal device, the multiplexing factor M based on a relationship between the quantity of the system frames in which the control channel search spaces corresponding to all the common signal blocks in the synchronization signal/broadcast channel block (SSB) burst set are located and a second preset system frame quantity.

8. The method according to claim 7, wherein a value of M is a first quantity or a second quantity, the first quantity is greater than the second quantity, and further comprising:

determining the multiplexing factor M based on the relationship between the duration of the control channel resource and the preset duration threshold;

determining, by the terminal device, that the value of M is the first quantity when the duration of the control channel resource is greater than the preset duration threshold, and determining, by the terminal device, that the value of M is the second quantity when the duration of the control channel resource is less than or equal to the preset duration threshold.

9. The method according to claim 7, wherein a value of M is a first quantity and a second quantity, the first quantity is greater than the second quantity, and further comprising:

determining the multiplexing factor M based on the relationship between the quantity of the system frames in which the control channel search spaces corresponding to all the common signal blocks in the SSB burst set are located and the second preset system frame quantity;

determining, by the terminal device, that the value of M is the second quantity when the quantity of the system frames in which the control channel search spaces corresponding to all the common signal blocks in the SSB burst set are located is greater than the second preset system frame quantity; and determining, by the terminal device, that the value of M is the first quantity when the quantity of the system frames in which the control channel search spaces corresponding to all the common signal blocks in the SSB burst set are located is less than or equal to the second preset system frame quantity.

10. The method according to claim 8, wherein the first quantity is 1 and the second quantity is ½.

11. A signal monitoring apparatus, comprising:

a processing module, configured to determine, based on received configuration information, an index of a first time unit in which a start position of a control channel resource of a control channel is located, wherein a system frame number in which the first time unit is located is determined based on a first parameter, a terminal device is configured to determine the first parameter based on a relationship between a quantity of system frames in which control channel search spaces corresponding to all common signal blocks in a synchronization signal/broadcast channel block (SSB) burst set are located and a first preset system frame quantity, each SSB corresponds to one control channel search space, and the processing module is further configured to monitor the control channel starting from a time domain position corresponding to the index of the first time unit, wherein the first parameter is a first value or a second value, the second value is less than the first value, and the first parameter is the first value when the quantity of system frames is greater than the first preset system frame quantity, and the first parameter is the second value when the quantity of system frames is less than or equal to the first preset system frame quantity.

12. The apparatus according to claim 11, wherein the first value is 4 and the second value is 2.

13. The apparatus according to claim 11, wherein the first preset system frame quantity is 1.

14. The apparatus according to claim 11, wherein the quantity of the system frames in which control channel search spaces corresponding to all common signal blocks in the synchronization signal/broadcast channel block (SSB) burst set are located is further determined based on at least one of a quantity of first time units comprised in one system frame, a start position parameter, a multiplexing factor, and a subcarrier spacing parameter, the first time unit is a time unit determined based on the subcarrier spacing parameter.

15. The apparatus according to claim 14, wherein the determination is based on a relation $k=\lfloor O \cdot 2^{\mu}+\lfloor i_{max} \cdot M \rfloor \rfloor / N_{slot}^{frame,\mu}$, k is the quantity of the system frames in which the control channel search spaces corresponding to all the common signal blocks in the SSB burst set are located, $i_{max}$ is a maximum index of common signal blocks in the SSB burst set, $N_{slot}^{frame,\mu}$ is the quantity of first time units comprised in one system frame, O represents the start position parameter, M is the multiplexing factor, and is the subcarrier spacing parameter.

16. The apparatus according to claim 11, wherein the system frame number satisfies $mod(SFN, T_m) = \lfloor (O \cdot 2^{\mu} + \lfloor i \cdot M \rfloor) / N_{slot}^{frame,\mu} \rfloor$, SFN represents a system frame number in which a control channel search space corresponding to a common signal block is located, i is an index number of the common signal block, $T_m$ is the first parameter, $N_{slot}^{frame,\mu}$ is a quantity of slots comprised in one system frame and which corresponds to the subcarrier spacing of the control channel, O represents a time domain offset, and M is a quantity of control channel search spaces in one time unit.

* * * * *